(12) United States Patent
Nordlin

(10) Patent No.: US 7,661,913 B2
(45) Date of Patent: Feb. 16, 2010

(54) HOLE SAW WITH DEPTH STOP

(75) Inventor: William F. Nordlin, Poplar Grove, IL (US)

(73) Assignee: Greenlee Textron Inc., Rockford, IL (US)

( * ) Notice: Subject to any disclaimer, the term of this patent is extended or adjusted under 35 U.S.C. 154(b) by 49 days.

(21) Appl. No.: 12/018,890

(22) Filed: Jan. 24, 2008

(65) Prior Publication Data

US 2008/0187405 A1      Aug. 7, 2008

Related U.S. Application Data

(60) Provisional application No. 60/897,317, filed on Jan. 25, 2007.

(51) Int. Cl.
*B23B 51/05* (2006.01)
(52) U.S. Cl. ........................ 408/202; 408/204
(58) Field of Classification Search ............ 408/68, 408/113, 14, 202, 204–209, 1 R; *B23B 51/04, B23B 51/05*
See application file for complete search history.

(56) References Cited

U.S. PATENT DOCUMENTS

| | | | |
|---|---|---|---|
| 201,908 A * | 4/1878 | Brockett | 408/202 |
| 417,486 A * | 12/1889 | Isabel | 408/202 |
| 1,522,102 A | 1/1925 | Cibelli | |
| 1,705,049 A | 3/1929 | Fournier | |
| 1,994,516 A * | 3/1935 | Hawn | 408/56 |
| 2,319,528 A * | 5/1943 | Barbour et al. | 408/205 |
| 4,297,059 A | 10/1981 | Miyanaga | |
| 4,652,185 A * | 3/1987 | Malrick | 408/68 |
| 4,941,783 A * | 7/1990 | Maier | 408/204 |
| 5,147,164 A | 9/1992 | Fraver | |
| 5,205,685 A | 4/1993 | Herbert | |
| 5,433,560 A * | 7/1995 | Duncan | 408/206 |
| 5,915,893 A * | 6/1999 | Miyanaga | 408/202 |
| 2008/0181738 A1 | 7/2008 | Capriotti et al. | |

FOREIGN PATENT DOCUMENTS

| | | | |
|---|---|---|---|
| DE | 29907717 U1 * | 8/1999 | |
| DE | 10032966 A1 * | 1/2002 | |
| JP | 05318217 A * | 12/1993 | |

* cited by examiner

*Primary Examiner*—Daniel W Howell
(74) *Attorney, Agent, or Firm*—Trexler, Bushnell, Giangiorgi, Blackstone & Marr, Ltd (57) ABSTRACT

A hole saw includes a depth stop for limiting the depth of penetration of the hole saw into a workpiece. The blade of the hole saw includes a plurality of slots, one of which is used to receive the depth stop. The depth stop is mounted to the blade by positioning a portion of the depth stop within the slot and sliding the depth stop from an unsecured position to a secured position. Once in the secured position, a locking member is moved within the depth stop to secure the depth stop in place. In use, the blade is advanced through the workpiece until the depth stop contacts the proximal surface of the workpiece.

5 Claims, 8 Drawing Sheets

HOLE SAW WITH DEPTH STOP

This application claims the domestic benefit of U.S. Provisional Application Ser. No. 60/897,317 filed on Jan. 25, 2007, which disclosure is hereby incorporated by reference.

FIELD OF THE INVENTION

This invention is generally directed to a hole saw with a depth stop.

BACKGROUND OF THE INVENTION

Hole saws have been used by tradesman for drilling holes in paneling and the like for a number of years. In particular, electricians routinely use hole saws made from a tubularly-shaped saw blade to drill holes into electrical boxes made out of sheet metal to allow the ingress and egress of wires. After the hole is drilled, the slug which has been cut away, often remains lodged in the blade. Typically, these hole saws have at least one oval-shaped slot located on the side of the blade. The slot has a longitudinal axis that is parallel with the direction of drilling. This slot allows the user to slip a tool such as a screw driver into the slot behind the slug and force the slug out of the blade.

Many times, these hole saws are used when wires are already present within the box. This presents the danger that some of the wires already present will be cut or otherwise damaged during the hole cutting operation as the hole saw penetrates the panel. The cut or damaged wires present an electrical hazard once the wires are energized. As a result of this need, many hole saws have been developed to provide some means for limiting the penetration of the blade and therefore greatly reducing the possibility of damaging existing wiring within the electrical box.

One example of such a hole saw is disclosed by U.S. Pat. No. 1,522,102 which discloses a hand-powered boring drill whose drilling depth is controlled by a surface found on the bottom of the component that serves as the handle for the saw. This hole saw has disadvantages including that the stop requires four screws for attaching it to the hole saw, that the components are larger and more expensive than necessary, and that it is not adapted to be driven by an electrical drill as is now standard in the industry.

Another hole saw that has control of the drilling depth is described in U.S. Pat. No. 1,705,049 which discloses the use of a collar that is located about the circumference of the hole saw and is held in place by a locking member that impinges upon the outside circumference of the hole saw. However, this hole saw has the disadvantage that different sized collars for hole saws of different diameters are needed. This increases the cost and complexity of the overall system.

U.S. Pat. No. 5,205,685 discloses a hole saw that has a plastic or metal collar that is attached to the circumference of the hole saw by welding or adhesive. This hole saw also has the disadvantage that different sized collars are needed for different diameters which increases the cost and complexity of the overall system. Furthermore, the attachment of the stop collar is permanent, preventing removal when it is desired to allow deep penetration of the hole saw.

For these reasons, there still exists a need for a hole saw that has a depth stop that is easy to attach to the hole saw, that can be used with hole saws of differing diameters, that can be easily detached from the hole saw when desired, that allows the removal of a slug that is trapped within the inner circumference of the hole saw, and that can be inexpensively manufactured.

SUMMARY OF THE INVENTION

Briefly, the present invention discloses a hole saw which includes a blade and a depth stop. A plurality of slots are provided through the blade and the depth stop is removably mounted in one of the plurality of slots. The blade with the mounted depth stop is then rotated by an associated drill to form a hole in the workpiece. As the blade penetrates the workpiece, the end surface of the depth stop contacts the surface of the workpiece to prevent further penetration of the blade through the workpiece. Once the hole has been cut, a tool can be inserted in one of the available slots to remove the slug from the blade. In addition, the depth stop can be removed from the blade to allow deeper penetration of the hole saw into the workpiece.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

A hole saw 20 is shown assembled with a depth stop 24 in FIGS. 1-5. The hole saw 20 includes a blade 22 and a backplate 23. A mounting aperture 25, for example, is provided for mounting the hole saw 20 to a driving mechanism, such as an electric hand drill (not shown), for drilling a hole through a workpiece as will be described herein. For ease of description, surfaces and elements positioned closest to the user when the hole saw 20 is in use are referred to as proximal elements and surfaces and elements furthest from the user are referred to as distal elements.

Figure 6:
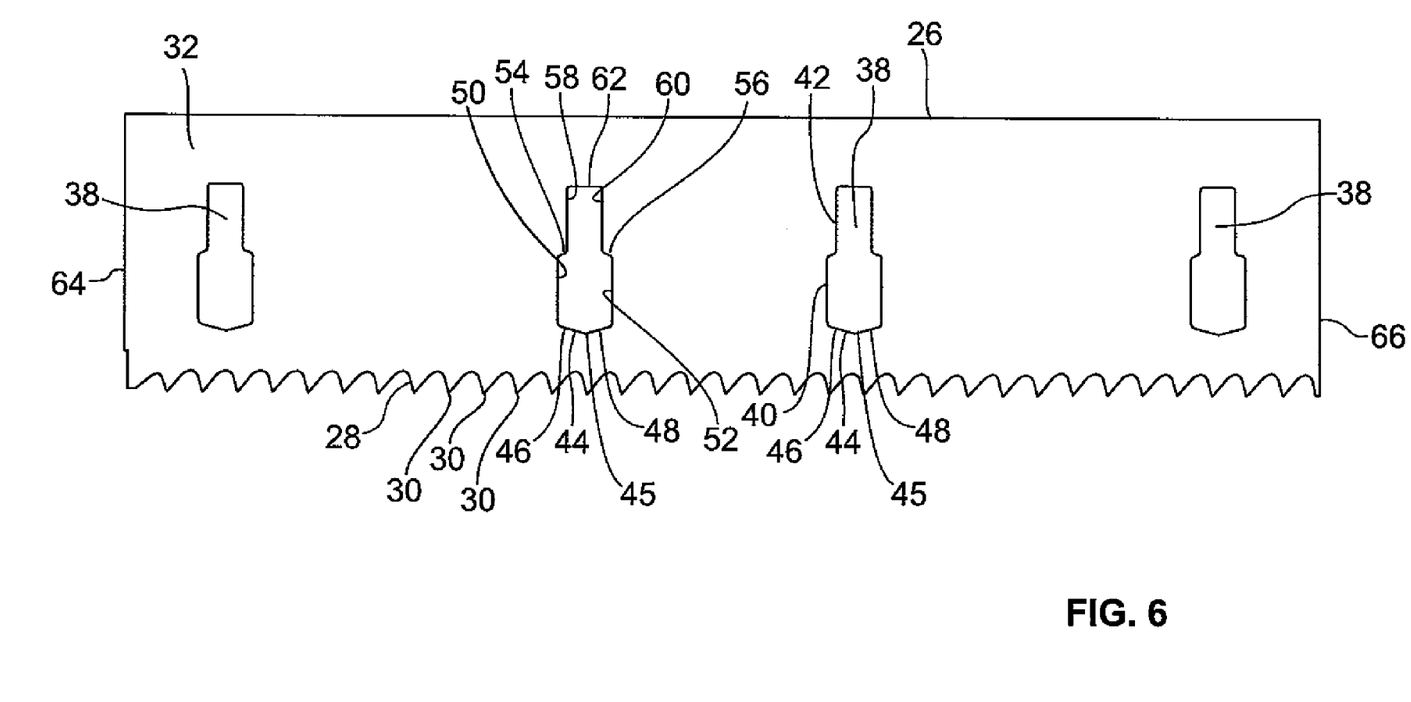
FIG. 6 is an elevational view of the stamped material from which the blade of the hole saw is formed.

The blade 22 is generally tubularly-shaped and includes a circularly-shaped proximal edge 26, shown in FIG. 6, which is mounted to the back plate 23. The blade 22 also includes a generally circularly-shaped distal edge 28 having cutting teeth 30.

The blade 22 is formed from a piece of flat stock 32 shown in FIG. 6. The flat stock 32 provides the distal edge 28 along with the teeth 30 of the blade 22, and the linear proximal edge 26. Identically formed slots 38 are provided through the flat stock 32 and at spaced apart locations. As shown, four identically formed slots 38 are equi-distantly positioned along the length of the flat stock 32. Each slot 38 generally looks like a key hole. Each slot 38 includes a first portion 40 spaced from the distal edge 28 of the blade 22 and a second portion 42 spaced from the proximal edge 26 of the blade 22. The first portion 40 of each slot 38 is wider than the second portion 42 of each slot 38. Each slot 38 is defined by a plurality of perimeter walls including a distal end wall 44 formed by a first segment 46 and a second segment 48; a first side wall 50 extending from the first segment 46; a second side wall 52 extending from the second segment 48; a first transition wall 54 extending from the first side wall 50 in a direction generally perpendicular to the first side wall 50; a second transition wall 56 extending from the second side wall 52 in a direction generally perpendicular to the second side wall 52; a third side wall 58 extending from the first transition wall 54 in a direction generally perpendicular to the first transition wall 54; a fourth side wall 60 extending from the second transition wall 56 in a direction generally perpendicular to the second transition wall 56; and a proximal end wall 62 opposite the distal side wall 44 and extending between ends of the third and fourth side walls 58, 60. The first, second, third and fourth side walls 50, 52, 58, 60 are generally parallel to one another and the proximal end wall 62 and the first and second transition walls 54, 56 are generally perpendicular to the first, second, third and fourth side walls 50, 52, 58, 60. The first and second segments 46, 48 of the distal end wall 44 meet at a distal point 45 and form an angle of approximately 150 degrees.

Figure 2:
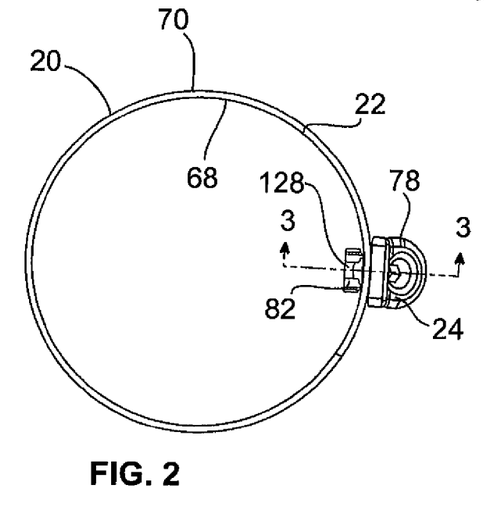
FIG. 2 is a bottom plan view of the hole saw and depth stop wherein the back plate of the hole saw has been removed.

To form the tubularly-shaped blade 22, opposite ends 64, 66 of the flat stock 32 are welded together providing an interior surface 68 and an exterior surface 70, see FIG. 2. Prior to welding opposite ends 64, 66, the slot 38 and the teeth 30 of the blade 22 are formed on the flat stock 32 preferably using a die and punch but can also be formed by any other means commonly known in the art.

Figure 7:
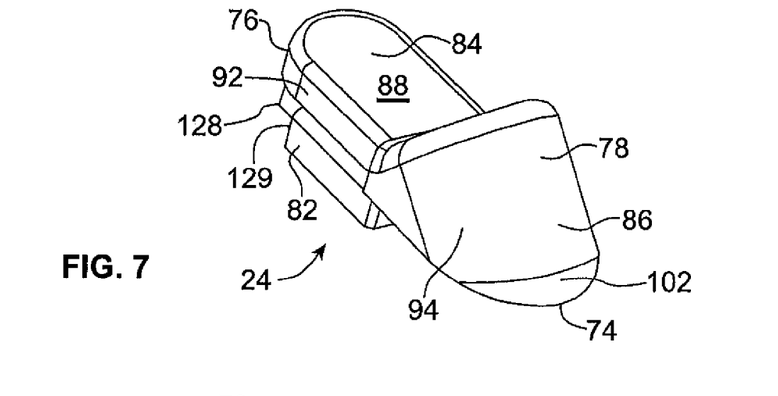
FIG. 7 is a perspective view of the depth stop which incorporates the features of a first embodiment of the invention.
Figure 8:
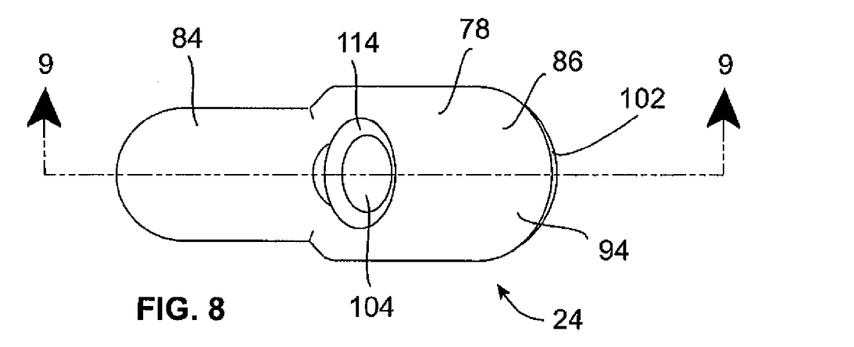
FIG. 8 is an elevational view of the depth stop of FIG. 7.
Figure 9:
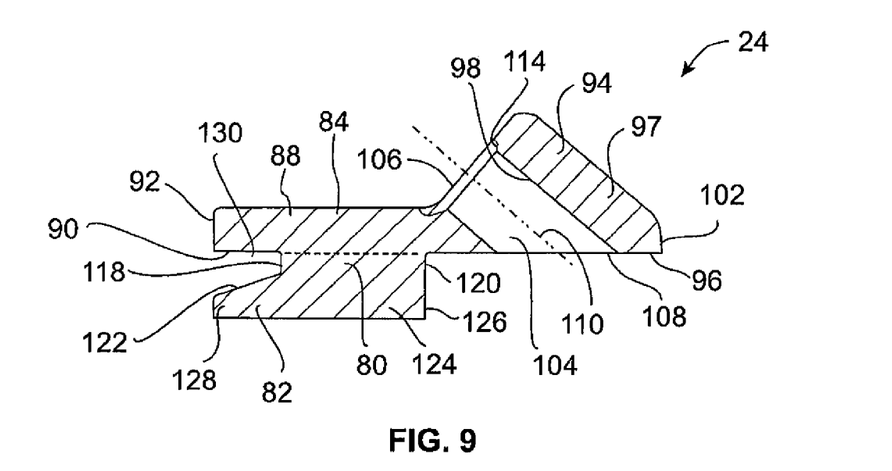
FIG. 9 is a cross-sectional view of the depth stop along line 9-9 of FIG. 8.
Figure 10:
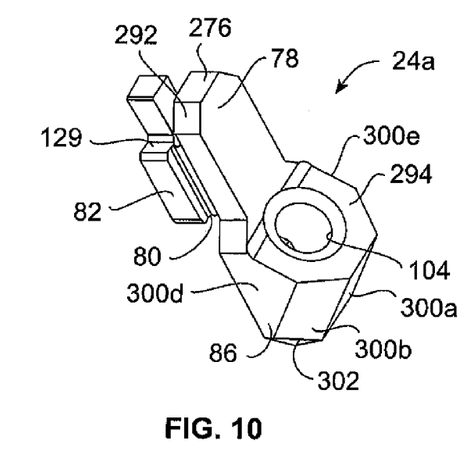
FIG. 10 is a perspective view of the depth stop which incorporates the features of a second embodiment of the invention.
Figure 11:
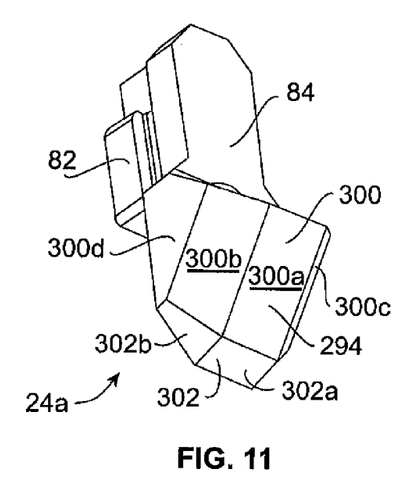
FIG. 11 is an alternative perspective view of the depth stop of FIG. 10.
Figure 12:
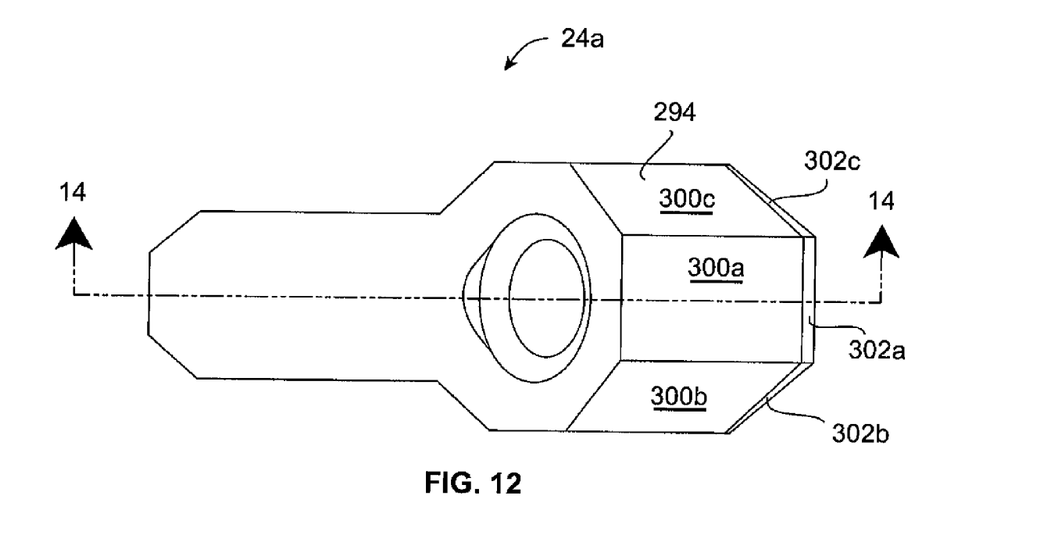
FIG. 12 is an elevational view of the depth stop of FIG. 10.

The depth stop 24 is mounted to the blade 22. A first embodiment of the depth stop 24 is shown in FIGS. 7-9. The depth stop 24 has a distal end 74 and a proximal end 76. The depth stop 24 includes a main body 78, a abutment portion 80 (see FIG. 9) extending from the main body 78 and a retention ear 82 extending from the abutment portion 80. The main body 78, the abutment portion 80 and the retention ear 82 are integrally formed.

The main body 78 includes a generally planar portion 84 and an enlarged end portion 86. The planar portion 84 includes an outer surface 88, an alignment surface 90 opposite the outer surface 88, and a peripheral edge 92 extending between the outer surface 88 and the alignment surface 90. The peripheral edge 92 is generally rounded at the proximal end 76 of the depth stop 24.

The enlarged end portion 86 extends from the planar portion 84 and is formed from a generally tubularly-shaped wall 94 generally having an interior surface 98, an exterior surface 97, and an alignment surface 96. The alignment surface 96 of the end portion 86 and the alignment surface 90 of the planar portion 84 of the main body 78 are co-planar. A rounded end surface 102 is provided at the distal end of the enlarged end portion 86 and extends from the exterior surface 97 to the alignment surface 96. The rounded surface 102 minimized friction between the depth stop 24 and the workpiece, thereby extending the life of the depth stop 24. The tubularly-shaped wall 94 defines a locking member passageway 104 having an entry opening 106 and an exit opening 108. A central axis 110 of the locking member passageway 104 is provided at an angle of approximately 40 degrees relative to the alignment surfaces 90, 96. A locking member 112 (FIGS. 3-5) is positioned within the locking member passageway 104 to secure the depth stop 24 to the hole saw 20. Preferably the locking member 112 is a set screw and the locking member passageway 104 includes a countersink 114 which receives the head of the locking member 112 as will be described herein. Preferably, the interior surface 98 includes a ¼-28 UNF internal thread. The exterior surface 97 of the wall 94 is parallel to the axis 110 of the locking member passageway 104.

Figure 3:
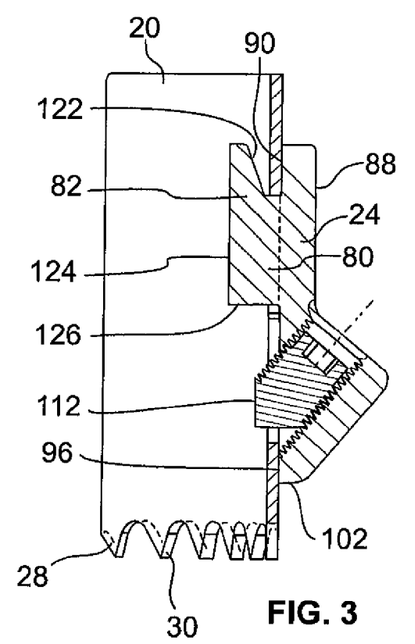
FIG. 3 is a cross-sectional view taken along line 3-3 of FIG. 2.
Figure 15:
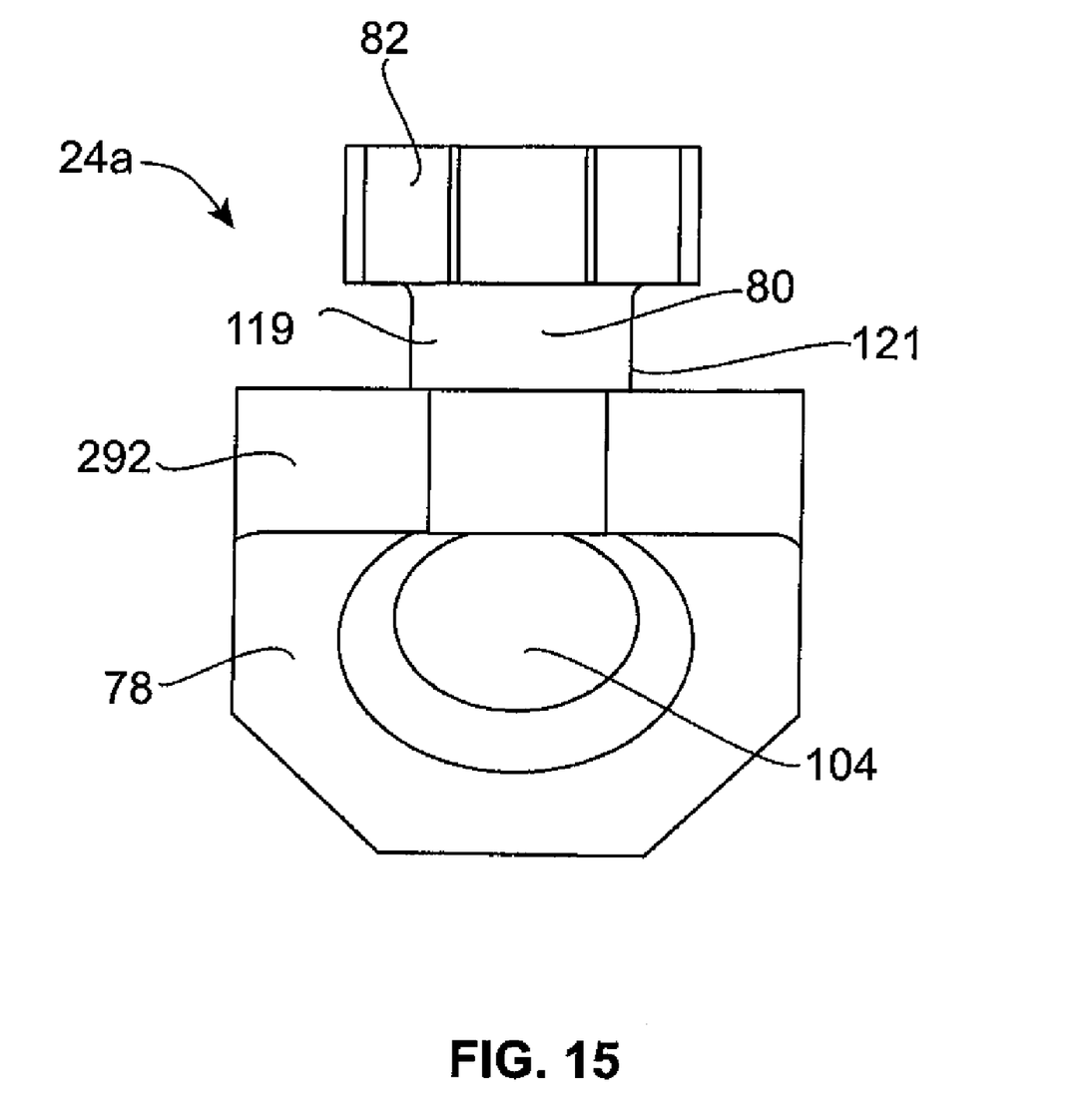
FIG. 15 is an elevational view of the depth stop of FIG. 10.

As best shown in FIGS. 3 and 9, the abutment portion 80 includes first and second side surfaces 119, 121, a proximal end surface 118 generally perpendicular to the first and second side surfaces 119, 121 (FIGS. 13 and 15), and a distal end surface 120 generally parallel to the proximal end surface 118. The abutment portion 80 extends generally perpendicular to the planar portion 84 of the main body 78 a distance approximately equal to the thickness of the flat stock 32 used to form the blade 22. The abutment portion 80 is narrower than the planar portion 84 and the retention ear 82 and is dimensioned so that the abutment portion 80 can be positioned within the second portion 42 of slot 38 in the blade 22.

The retention ear 82 is generally planar and extends from the abutment portion 80. The retention ear 82 includes an extension 128 extending proximally of the abutment portion 80. Shoulders 129 (FIG. 7) are provided by the extension 128 and the remainder of the retention ear 82. The retention ear 82 includes an alignment surface 122 and an interior surface 124. The alignment surface 122 of the retention ear 82 is angled relative to the alignment surfaces 90, 96 of the main body 78 and thus provides a generally tapered retention ear 82. A distal end surface 126 of the retention ear 82 is generally planar with the distal end surface 120 of the abutment portion 80. As best shown in FIG. 9, a notch 130 is defined by the alignment surface 90 of the planar portion 84 of the main body 78, the proximal end surface 118 of the abutment portion 80 and the alignment surface 96 of the retention ear 82 at the extension 128. The retention ear 82 is appropriately sized so that the retention ear 82 can pass through the first portion 40 of one of the slots 38 of the blade 22 as will be described herein.

A second embodiment of the depth stop 24a is shown in FIGS. 10-15. The depth stop 24a is similar to the depth stop 24 shown in FIGS. 7-9 with the following exceptions. Elements of depth stop 24a which are similar to elements of depth stop 24 are not described again herein and have been identified with the same reference numerals.

Unlike the peripheral edge 92 of the depth stop 24 which is rounded, the peripheral edge 292 of the planar portion 84 of the depth stop 24a is faceted at the proximal end.

The enlarged end portion 86 of depth stop 24a includes a wall 294 which defines the locking member passageway 104. Unlike the exterior surface of the wall 94 of depth stop 24 which is generally smooth and rounded, the exterior surface of the wall 294 of the depth stop 24a is faceted and includes a plurality of planar surfaces 300a, 300b, 300c, 300d, 300e. Each surface 300a, 300b, 300c, 300d, 300e generally extends parallel to the central axis 110 of the locking member passageway 104. The depth stop 24a also includes a faceted end surface 302. Unlike the end surface 102 of the depth stop 24 which is generally rounded, the end surface 302 of the depth stop 24a includes a plurality of flats 302a, 302b, 302c. The flats 302a, 302b, 302c extend from the planar surfaces 300a, 300b, 300c, 300d, 300e to the alignment surface 96 of the enlarged end portion 86. Each flat 302a, 302b, 302c is aligned with a corresponding surface 300a, 300b, 300c of the wall 294. Each flat 302a, 302b, 302c is provided at an angle of approximately eighty degrees (80°) relative to the alignment surface 96 of the end portion 86. A centrally-positioned end surface 302a is provided at the distal end 74 of the depth stop 24a.

The depth stop 24a is preferably formed using a powdered metal process and the faceted surfaces 292, 300a, 300b, 300c, 300d, 300e, 302a, 302b, 302c aid in the manufacturing process.

Figure 13:
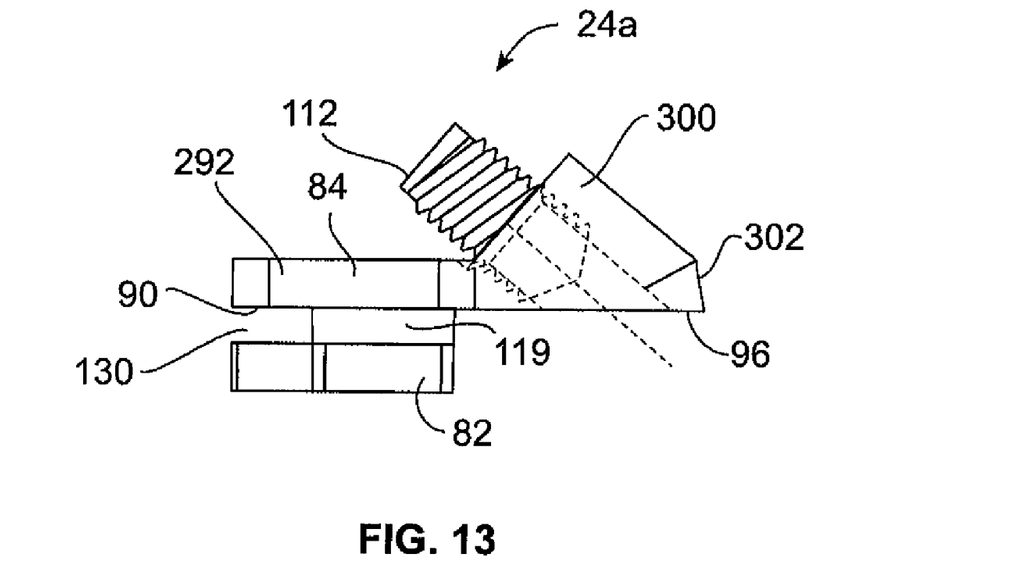
FIG. 13 is an elevational view of the depth stop of FIG. 10 with a locking member shown in phantom line set therein.
Figure 14:
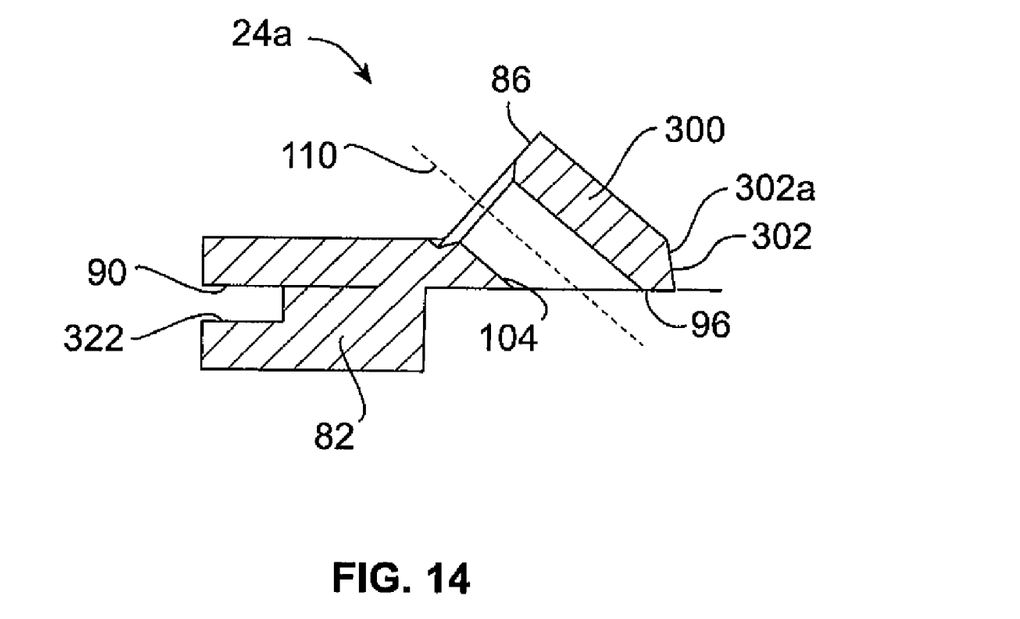
FIG. 14 is a cross-sectional view along line 14-14 of FIG. 12.

Finally, as best shown in FIGS. 13 and 14, unlike the retention ear 82 of the depth stop 24 which is tapered, the retention ear 82 of the depth stop 24a is not tapered. Thus, the abutment surface 322 of the retention ear 82 of the depth stop 24a is generally parallel to the alignment surfaces 90, 96 of the main body 78. It is to be understood that the retention ear 82 of the depth stop 24a may be tapered.

Figure 4:
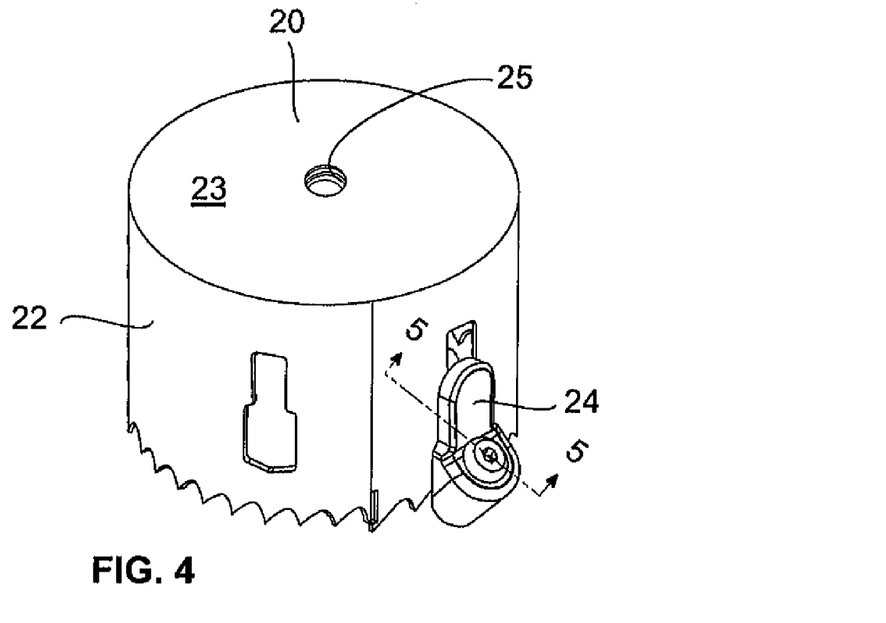
FIG. 4 is a perspective view of the hole saw with the depth stop mounted therein in an unsecured position.
Figure 5:
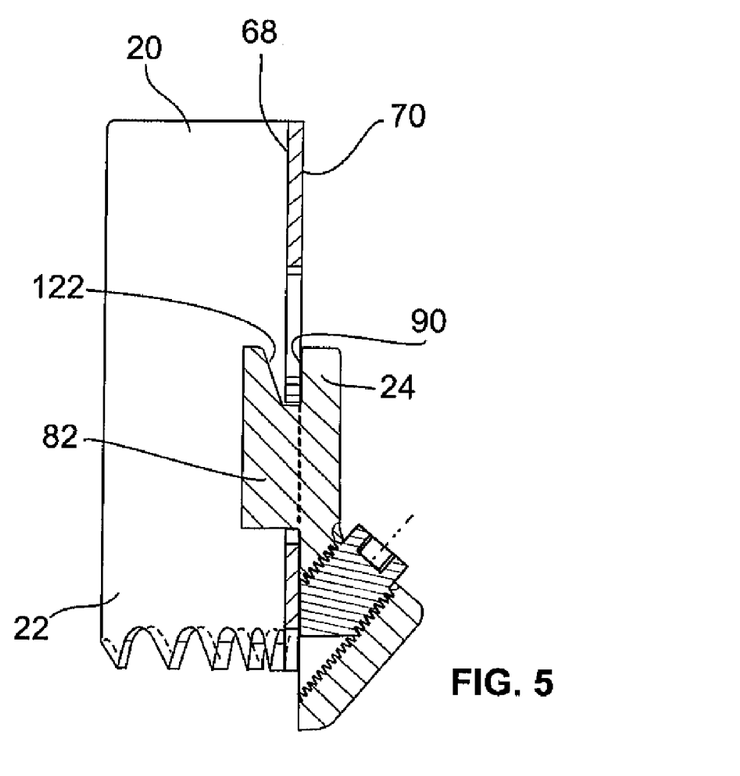
FIG. 5 is a cross-sectional view of the hole saw along line 5-5 in FIG. 4.

Assembly of the depth stop 24 or 24a with the blade 22 is accomplished in the same manner. Assembly of the depth stop 24 with the blade 22 is shown and described herein. Prior to mounting the depth stop 24, the user ensures that the locking member 112 is in a retracted position to ensure that the locking member 112 does not interfere with the blade 22 and prevent mounting of the depth stop 24. As shown in FIGS. 4 and 5, the depth stop 24 is mounted to the blade 22 by positioning the depth stop 24 proximate the exterior surface 70 of the blade 22 and aligning the retention ear 82 with the first portion 40 of one of the slots 38 in the blade 22. The retention ear 82 of the depth stop 24 is then passed through the first portion 40 of the slot 38 until the alignment surface 90 of the main body 78 abuts the exterior surface 70 of the blade 22 and the abutment portion 80 is positioned within the first portion 40 of the slot 38. With the retention ear 82 passed through the slot 38, the abutment portion 80 is generally co-planar with the portions of the blade 22 immediately surrounding the slot 38. The depth stop 24 is then slid in the proximal direction relative to the blade 22 to a secured position. The angled surface 122 of the retention ear 82 eases the sliding motion of the retention ear 82 of the depth stop 24 relative to the blade 22.

Figure 1:
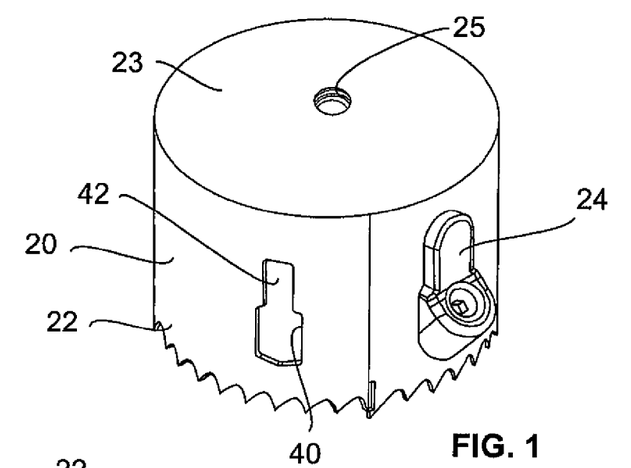
FIG. 1 is a perspective view of a hole saw and a depth stop which incorporates features of the present invention, wherein the depth stop is shown in a secured position.

As shown in FIGS. 1-3, in the secured position, the abutment portion 80 of the depth stop 24 is positioned in the second smaller portion 42 of the slot 38 such that the first and second side surfaces of the abutment portion 80 are proximate the third and fourth side walls 58, 60 of the slot 38 and the proximal end surface 118 of the abutment portion 80 abuts the proximal end wall 62 of the slot 38. Due to the angle of the alignment surface 122 of the retention ear 82, a gap is provided between the inner surface 68 of the blade 22 and the alignment surface 122.

Next, the locking member 112, preferably a screw, is rotated until the tip of the locking member 112 extends through the exit opening 108 of the locking member passageway 104 and extends beyond the alignment surface 96 of the main body 78 of the depth stop 24. The angle between the central axis 110 of the locking member passageway 104 and the main body 78 of the depth stop 24 provides the user with easy access to the locking member 112. The tip of the locking member 112 provides an included angle which matches the included angle provided by the first and second segments 46, 48 of the distal end wall 44 of the slot 38. As the locking member 112 is rotated further, the tip of the locking member 112 engages the first and second segments 46, 48 of the distal end wall 44 of the slot 38 to secure the depth stop 24 in the secured position. The angled relationship between the locking member passageway 104 and the blade 22 allows the user to easily access the locking member 112 for moving the locking member between secured and unsecured positions. In this secured position, the depth stop 24 is constrained in all directions. The depth stop 24 is constrained in the proximal and distal directions through engagement of the proximal end surface 118 of abutment portion 80 of the depth stop 24 with the proximal end wall 62 of the slot 38 of the blade 22 and by engagement of the locking member 112 with the distal end wall 44 of the slot 38. The depth stop 24 is constrained in a side to side direction in part through engagement of the first and second side surfaces 119 of the abutment portion 80 of the depth stop 24 with the third and fourth side walls 58, 60 of the slot 38 of the blade 22.

Figure 16:
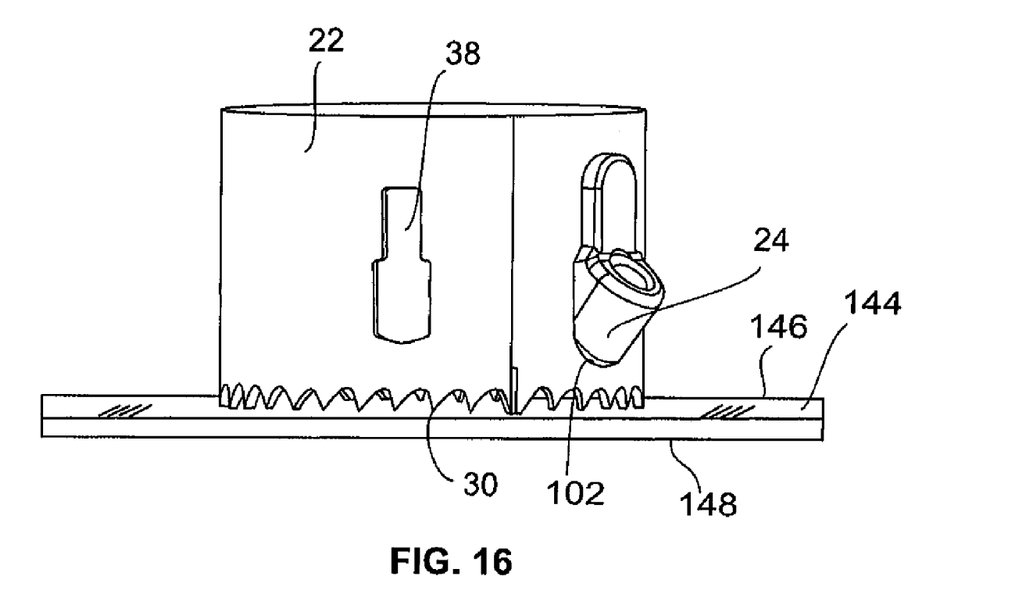
FIG. 16 is a perspective view of the hole saw with the depth stop of FIGS. 7-9 mounted therein, relative to a workpiece in an initial cutting stage.
Figure 17:
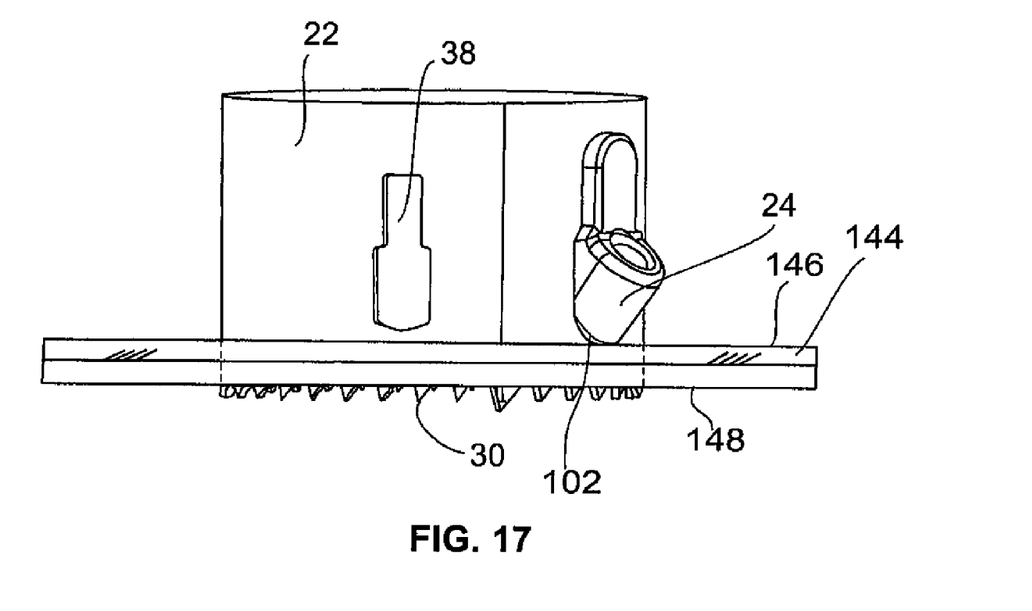
FIG. 17 is a perspective view of the hole saw with the depth stop of FIGS. 7-9 mounted therein, relative to a workpiece at a final cutting stage.

The depth stops 24, 24a are used in the same manner. As shown in FIGS. 16 and 17, the hole saw 20 with the depth stop 24 is used to cut holes through a workpiece 144 having a proximal surface 146 and a distal surface 148. As shown in FIG. 16, as the blade 22 is rotated, the teeth 30 engage the workpiece 144 to be cut. As shown in FIG. 17, upon further rotation and penetration of the blade 22 through the workpiece 144, the end wall 102 of the depth stop 24 contacts a proximal surface 146 of the workpiece 144 preventing further penetration of the blade 22 into the workpiece 144. Preferably, the slots 38 of the blade 22 and the depth stop 24 are dimensioned and configured to limit the teeth 30 of the blade 22 from extending more than a quarter of an inch past the distal surface 146 of the workpiece 144. By limiting the depth of the penetration, cutting of wires in an electrical box, for example, can be avoided.

Upon completion of cutting, if a slug is lodged in blade 22, a tool can be inserted in one of the remaining available slots 38 to remove the slug from the blade 22. Furthermore, if the user does not wish to limit the depth of the next hole to be cut, the depth stop 24 can be easily removed from the blade 22 by reversing the steps taken to attach the depth stop 24 to the blade 22. Alternatively, if the user chooses to cut a hole of a different diameter, the depth stop 24 can be removed from the blade 22 and attached to a blade with the alternate diameter.

As shown and described, the depth stop 24, 24a can be easily mounted to and dismounted from the blade 22 of the hole saw 20. The ease with which the depth stop 24, 24a can be mounted and dismounted provides the user the ability of mounting the depth stop 24, 24a when the depth of penetration is to be limited and quickly and easily removing the depth stop 24, 24a when deeper penetration is desired. In addition, the same depth stop 24, 24a can be used in connection with hole saws having varying diameters, significantly reducing the complexity and cost of the overall hole saw assembly 20. Finally, additional slots 38 allow for easy removal of the slug from the blade 22.

While a plurality of slots 38 are shown, it is to be understood that only a single slot 38 is necessary for the present invention to function.

While preferred embodiments of the present invention are shown and described, it is envisioned that those skilled in the art may devise various modifications of the present invention without departing from the spirit and scope of the appended claims.

The invention claimed is:

1. A hole saw comprising:
    a backplate;
    a blade having opposite ends and extending from said backplate at one of said ends, an exterior surface, and an interior surface;
    a plurality of teeth at the other of said ends;
    a slot extending from said exterior surface to said interior surface, said slot having a first portion and a second portion, a width of said first portion is larger than a width of said second portion, said slot being spaced from said opposite ends of said blade such that said ends of said blade are not interrupted by said slot.

2. The hole saw of claim 1, wherein said slot includes an end wall having first and second segments angled relative to each other.

3. The hole saw of claim 2, wherein said first and second segments form an angle of approximately 150 degrees.

4. The hole saw of claim 1, wherein a plurality of said slots are formed through said blade.

5. The hole saw of claim 1 in combination with a depth stop, said depth stop comprising a main body having an end surface and a locking member passageway therethrough, an abutment portion extending from said main body and through said slot; a locking member capable of being inserted into said locking member passageway and being removable therefrom, said depth stop capable of being within the slot in an unsecured position wherein said depth stop can slide within said slot, said depth stop being capable of moving to a secured position wherein said abutment portion abuts an end of said slot and said locking member abuts an opposite end of said slot upon engagement of said locking member with said main body, and wherein, in use, said end surface of said main body abuts the workpiece to limit penetration of the hole saw into the workpiece.

* * * * *